Patented Oct. 4, 1949

2,483,824

UNITED STATES PATENT OFFICE 2,483,824

DERIVATIVES OF 2,1-BENZOPYRAN

Bradford P. Geyer, Berkeley, and Seaver A. Ballard, Orinda, Calif., assignors to Shell Development Company, San Francisco, Calif., a corporation of Delaware No Drawing. Application July 29, 1947, Serial No. 764,594

11 Claims. (Cl. 260—333)

This invention relates to new and valuable chemical compounds, and to a method for their preparation. More particularly, the present invention relates to new and useful derivatives of 2,1-benzopyran, and to a method for their preparation.

Compounds derived from or structurally related to a benzopyran may be identified in part by reference to the position in the benzopyran nucleus of the oxygen atom that forms a part of the heterocyclic structure. The present invention relates to compounds in the benzopyran series of compounds in which the heterocyclic oxygen atom is in the 2-position of the benzopyran nucleus. In the present specification and in the appended claims, the several positions in the heterocyclic nucleus thus may and will be designated as in the following schematic representation thereof.

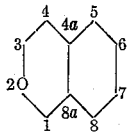

The present invention relates in particular to derivatives of hexahydro-2,1-benzopyran which contain a formyl substituent group attached to the carbon atom in the "angular" position designated in the foregoing formula as position 8a and in which the carbon atoms in positions 6 and 7 are connected by an olefinic bond, and to a method for the preparation of the same.

According to the process of the present invention, the novel compounds of the present invention are prepared by reacting 5,6-dihydro-1,2-pyran-3-carboxaldehyde or one of its alkyl substitution products with an unsaturated hydrocarbon containing at least one conjugate pair of olefinic bonds, under conditions of temperature, time, and relative proportions of the reactants which favor appreciable addition of the reactants to form a compound of the herein defined class. The reaction may be effected by heating a mixture of the reactants at an elevated temperature for sufficient time. The reactants may be employed in various proportions relative to one another, a suitable range of proportions comprising mole ratios of the two reactants of from about 1:10 to about 10:1, a preferred range being from about 2:1 to about 1:2. The temperature that is employed should be sufficiently elevated to cause the desired reaction to take place, but not so high that undesired side reactions, decomposition reactions, polymerization reactions, or the like, occur excessively. Temperatures of from about 50° C. to about 250° C. generally are suitable, a preferred range of temperatures being from about 100° C. to about 200° C. The desired reaction may be effected at either normal atmospheric pressures or at pressures above or below atmospheric pressures. Pressures of about atmospheric generally are most convenient, although if it is desired to employ a temperature above the boiling point of the reaction mixture at atmospheric pressures, superatmospheric pressures may be employed with advantage. Such superatmospheric pressures may be either autogenous, as would arise in a closed reaction vessel, or they may be applied as by introduction of a suitable inert gas, such as nitrogen, methane, carbon dioxide or the like, into the reaction vessel.

The time required for the desired reaction to take place depends upon the particular reactants that are involved and upon the particular conditions that are employed to effect the reaction. The time may be varied as desirable from a few hours upwards, in any particular instance the conversion of the reactants to the desired reaction product being generally proportional to the length of time employed. The extent of the reaction at any given time may be determined conveniently by withdrawing an aliquot of the reaction mixture and determining its content of unreacted hydrocarbon or of the desired reaction product in any suitable manner, such as by fractional distillation or by the use of suitable chemical tests. If, as frequently may be desirable, the reaction is effected at the reflux temperature of the reaction mixture, there may occur a rise in the reflux temperature as the reaction proceeds. The amount of such a rise in the reflux temperature frequently may be employed as an approximate and convenient indication of the extent to which the reaction has proceeded.

The process of the present invention may be executed with the reactants dissolved, or dispersed, in a suitable inert solvent or dispersing medium, such as a saturated hydrocarbon, an ether, an ester, or the like. The use of such media is not essential, however, and it frequently may be more convenient and efficacious to cause the reactants to interact in the absence of any added solvent medium. The process may be executed by introducing the dihydropyran carboxaldehyde and the unsaturated hydrocarbon, and a solvent if one is employed, into a suitable reaction vessel and heating the mixture at a suitable temperature for a length of time sufficient to cause the reaction to take place. The reaction vessel conveniently may be one equipped with a reflux condenser, in which case the reaction may be effected at the reflux temperature of the reaction mixture. Alternatively, the reaction vessel may be closed from the atmosphere, and the reaction may be effected with the reactants under a pressure greater than atmospheric pressures. The process may be carried out in either a batchwise manner, an intermittent manner, or continuously. Upon completion of the reaction, the mixture may be withdrawn from the reaction vessel and subjected to any suitable treatment leading to recovery of the desired product of the reaction. Fractional distillation is a generally effective method of recovering the desired product. However, other methods, such as treatment with selective solvents, crystallization, chemical methods of separation, and the like, may be employed if desired.

The compounds to which the present invention relates are derivatives of 3,4,4a,5,8,8a-hexahydro-2,1-benzopyran that contain a formyl substituent group attached to the carbon atom in position 8a of the benzopyran nucleus and that contain either hydrogen atoms or hydrocarbon groups attached to other carbon atoms in the benzopyran nucleus. The derivatives of benzopyran to which the present invention relates possess a high degree of utility in numerous applications. They possess attributes which render them highly desirable compounds. The present compounds thus are valuable chemical intermediates, their value in this respect being due in part to the position of the formyl substituent group in the heterocyclic nucleus, and in part to other essential and distinctive characteristics of their structure, including but not being limited to, the position of the oxygen atom that forms a part of the heterocyclic nucleus and the position of the olefinic bond in the nucleus.

Within the class of compounds to which the present invention relates, the specific character of any hydrocarbon group or groups that may be attached to the 2,1-benzopyran nucleus, and the particular location of such group or groups, may influence greatly and modify desirably the characteristics of the individual members of the class as such characteristics are provided by the aforesaid distinguishing features of the class as a whole. The particular derivative of hexahydro-2,1-benzopyran within the herein defined class that is obtained by the process of the invention is determined by the individual reactants that are employed. By reason of the ease and the low cost with which it may be prepared, and because of the particularly desirable characteristics of the resultant products, the specific compound 5,6-dihydro-1,2-pyran-3-carboxaldehyde is preeminently suited to use in the present process as the dihydropyran carboxaldehyde reactant. Other derivatives of 5,6-dihydro-1,2-pyran having a formyl substituent group attached to the carbon atom in the 3-position of the dihydropyran ring may be employed in the process of the invention, such as those derivatives which contain up to four separate substituent groups or atoms attached to carbon atoms of dihydropyran ring. A preferred group of dihydropyran carboxaldehydes which may be employed in the process of the invention may be defined by reference to the structural formula

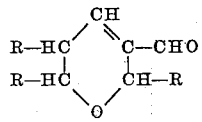

in which each R represents one of the group consisting of the hydrogen atom and the alkyl radicals. Compounds having structures corresponding to this structural formula include, among others, the following: 2,5-dimethyl-5,6-dihydro-1,2-pyran-3-carboxaldehyde, 2-methyl-5,6-dihydro-1,2-pyran-3-carboxaldehyde, 2,6-dimethyl-5,6-dihydro-1,2-pyran-3-carboxaldehyde, 5-ethyl-5,6-dihydro-1,2-pyran-3-carboxaldehyde, 6-isopropyl-5,6-dihydro-1,2-pyran-3-carboxaldehyde, 2,5,6-trimethyl-5,6-dihydro-1,2-pyran-3-carboxaldehyde and the like and their homologs and their analogs which correspond in structure to the foregoing formula when R represents either the hydrogen atom or an alkyl group such as methyl, ethyl, propyl, isopropyl, the butyls, the pentyls, etc.

According to the process of the invention, the aforesaid derivative of dihydropyran is reacted with an unsaturated hydrocarbon containing at least two olefinic bonds that are in conjugate relation to yield a derivative of 2,1-benzopyran of the herein defined class. A wide variety of unsaturated hydrocarbons is adapted to use in and may be employed in the process of the present invention. However, it is essential that the unstaturated hydrocarbon contain at least one conjugate pair of olefinic bonds. The hydrocarbon may be substituted hydrocarbon, i. e., a hydrocarbon containing one or more substituent groups or atoms comprising one or more atoms of an element other than carbon and hydrogen, such as one or more atoms of oxygen, sulfur, nitrogen, halogen, etc., or it more desirably may be an unsubstituted hydrocarbon, that is, a compound consisting solely of atoms of hydrogen and carbon. By the term unsaturated hydrocarbon it is intended to include both the acyclic straight- and branched-chain hydrocarbons and the cyclic hydrocarbons. Such unsaturated hydrocarbons may contain in addition to the olefinic bonds that are in conjugate relation, one or more carbon-to-carbon unsaturated bonds, such as one or more additional olefinic bonds, or acetylenic bonds, aromatic bonds, etc. Among the suitable hydrocarbons which may contain carbon-to-carbon multiple bonds in addition to the essential diolefinic grouping are included, for example, trienes, tetraenes, dienynes, trienynes, aryl-substitution products of these and related unsaturated hydrocarbons and the like. A particularly suitable group of unsaturated hydrocarbons which may be reacted with 5,6-dihydro-1,2-pyran-3-carboxaldehyde or one of its alkyl-substitution products of the above defined class to yield valuable derivatives of 2,1-benzopyran comprises the dienes which contain in an open chain grouping or in a cycloaliphatic grouping the diolefinic structural unit represented by the formula $$-CH=C(R')-C(R')=CH-$$

in which R' represents a member of the group consisting of the hydrogen atom and the saturated and the aromatic hydrocarbon radicals, and in which the free valencies at the terminal carbon atoms of the unit are satisfied by attachment to a member of the group consisting of the hydrogen atom, the saturated carbon atoms and the aromatic carbon atoms. By the term "saturated carbon atom" it is intended to refer to a carbon atom that is attached to four atoms by univalent bonds. Within this group, particularly desirable products are obtained when the hydrocarbon containing the aforesaid unit contains not more than two aliphatic carbon-to-carbon multiple bonds. Suitable unsaturated hydrocarbons which contain the above structural unit include, among others, the following: the acyclic conjugated dienes such as 1,3-butadiene, 1,3-pentadiene, 2,4-hexadiene, 1,3-hexadiene, 2-methyl-1,3-butadiene, 2,3-dimethyl-1,3-butadiene, 2-methyl-1,3-pentadiene, 2,3-dimethyl-1,3-pentadiene, 2,3-diethyl-1,3-hexadiene, and the like and their analogs and their homologs; cycloaliphatic dienes, such as 1,3-cyclopentadiene, 1,3-cyclohexadiene, 1,3-cycloheptadiene, and the like and their alkyl substitution products; and unsaturated hydrocarbons containing a diolefinic grouping and in addition thereto one or more aromatic groups, such as 1-phenyl-1,3-butadiene, 2-phenyl-1,3-pentadiene, 1-tolyl-1,3-hexadiene, 2-methyl-3-phenyl-1,3-butadiene, 1-naphthyl-1,3-pentadiene, 2-phenyl-1,3-cyclohexadiene, and the like and their homologs and their analogs.

The compounds to which the invention relates are 3,4,4a,5,8,8a - hexahydro-2,1-benzopyran-8a-carboxaldehydes that have structures that may be represented by the structural formula

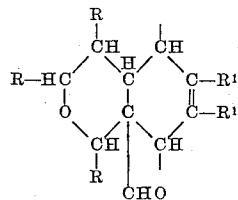

in which each R represents one of the group consisting of the hydrogen atom and the alkyl radicals, each R¹ represents one of the group consisting of the hydrogen atom and the saturated and the aromatic hydrocarbon radicals, and the free valencies at the carbon atoms in the 5- and 8-positions are satisfied by attachment to members of the group consisting of the hydrogen atom and the saturated and the aromatic carbon atoms. The group defined by this formula includes the compounds represented when the free valencies at the carbon atoms in 5- and 8-positions are satisfied by attachment to hydrogen atoms or to separate hydrocarbon radicals, as in the formula

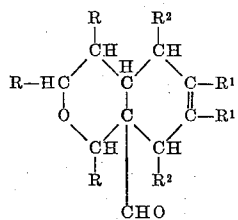

in which R and R¹ have their above significance and each R² represents either the hydrogen atom or a saturated or an aromatic hydrocarbon radical. The group also includes the 5,8-endoalkylene-3,4,4a,5,8,8a - hexahydro-2,1-benzopyran-8a-carboxaldehydes represented by the formula

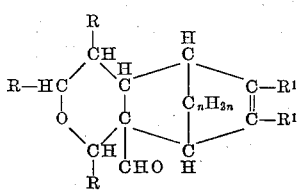

in which R and R¹ have their previously defined significance and in which $n$ represents an integer that desirably is not greater than 3.

Among the numerous compounds which may be prepared according to the process of the present invention, and to which the invention relates, may be mentioned the following:

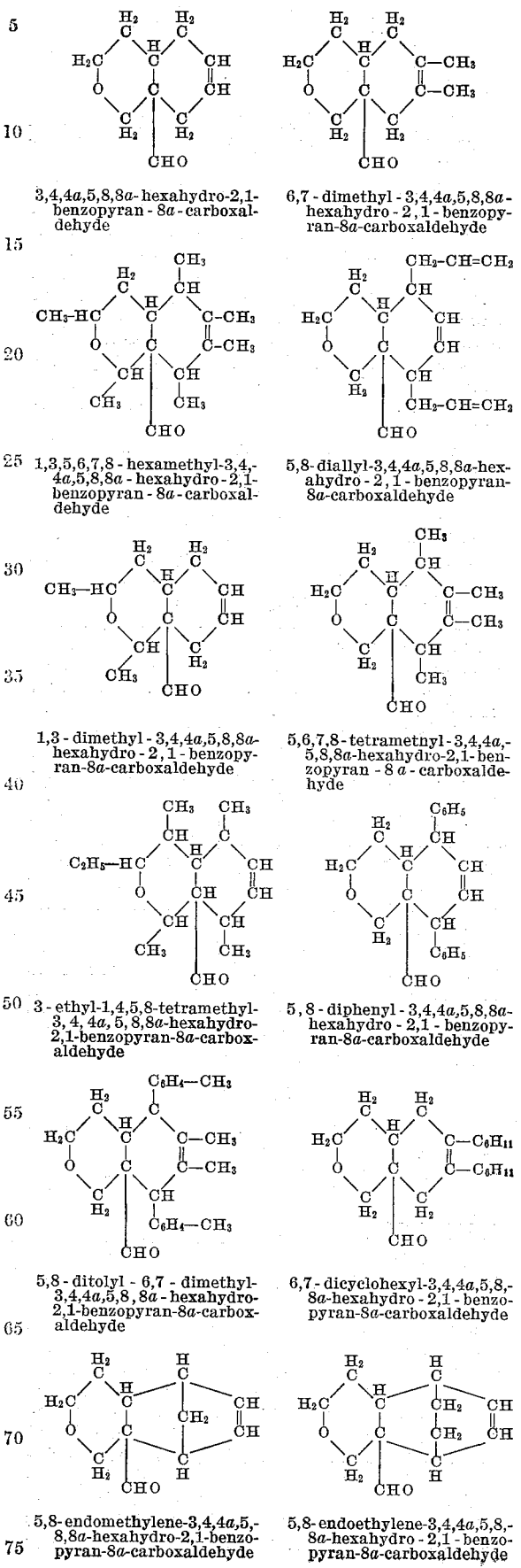

3,4,4a,5,8,8a-hexahydro-2,1-benzopyran-8a-carboxaldehyde 6,7-dimethyl-3,4,4a,5,8,8a-hexahydro-2,1-benzopyran-8a-carboxaldehyde 1,3,5,6,7,8-hexamethyl-3,4,4a,5,8,8a-hexahydro-2,1-benzopyran-8a-carboxaldehyde 5,8-diallyl-3,4,4a,5,8,8a-hexahydro-2,1-benzopyran-8a-carboxaldehyde 1,3-dimethyl-3,4,4a,5,8,8a-hexahydro-2,1-benzopyran-8a-carboxaldehyde 5,6,7,8-tetramethyl-3,4,4a,5,8,8a-hexahydro-2,1-benzopyran-8a-carboxaldehyde 3-ethyl-1,4,5,8-tetramethyl-3,4,4a,5,8,8a-hexahydro-2,1-benzopyran-8a-carboxaldehyde 5,8-diphenyl-3,4,4a,5,8,8a-hexahydro-2,1-benzopyran-8a-carboxaldehyde 5,8-ditolyl-6,7-dimethyl-3,4,4a,5,8,8a-hexahydro-2,1-benzopyran-8a-carboxaldehyde 6,7-dicyclohexyl-3,4,4a,5,8,8a-hexahydro-2,1-benzopyran-8a-carboxaldehyde 5,8-endomethylene-3,4,4a,5,8,8a-hexahydro-2,1-benzopyran-8a-carboxaldehyde 5,8-endoethylene-3,4,4a,5,8,8a-hexahydro-2,1-benzopyran-8a-carboxaldehyde

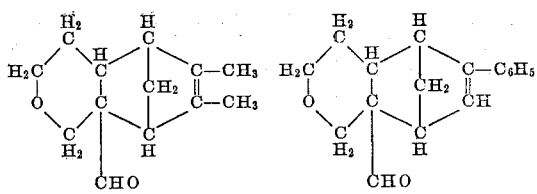

5,8 - endomethylene - 6,7 - dimethyl-3,4,4a,5,8,8a-hexahydro-2,1-benzopyran-8a-carboxaldehyde 5,8-endomethylene-6-phenyl-3,4,4a,5,8,8a-hexahydro-2,1-benzopyran-8a-carboxaldehyde As stated previously herein, the specific compound 5,6-dihydro-1,2-pyran-3-carboxaldehyde is pre-eminently suited to preparation of compounds to which the present invention relates, in part because of the desirable characteristics of the products thereby obtained. The compounds which are obtained when this preferred reactant is employed in the process of the invention, correspond to the foregoing generic structural formulas when R represents the hydrogen atom. The presence of the maximum number of hydrogen atoms attached directly to the ring which contains the heterocyclic oxygen atom contributes desirably to the usefulness of the compounds thus defined, in such a manner that they are regarded as constituting a preferred class of compounds within the broader teachings of the invention.

The compounds to which the present invention relates have varied uses in the arts, depending upon the specific compound that is under consideration. Many of the compounds are of particular value as special solvents, plasticizers, and the like, or as intermediates convertible to special solvents, plasticizers, etc. By virtue of their chemical structure, the products that are provided by the present invention are highly useful as chemical intermediates. Among their purely chemical applications may be mentioned their conversion to useful acids and useful hydroxylic derivatives of hexahydro-2,1-benzopyran, and also their conversion via chemical reactions that involve substitution and/or addition reactions at the olefinic bond in the benzopyran nucleus or substitution reactions at carbon atoms elsewhere in the molecule.

The following example is given for the purpose of further illustrating the invention, but it is to be understood that the generic invention is not limited to the procedural details of this example or to the specific, representative compound of the herein defined class that is prepared.

*Example*

A mixture of 56 parts of 5,6-dihydro-1,2-pyran-3-carboxaldehyde and 41 parts of methylpentadienes containing 2-methyl-1,3-pentadiene was placed in a reaction vessel equipped with a reflux condenser. The mixture was heated to the reflux temperature and maintained at reflux for 64 hours. During this time the temperature of the mixture rose gradually from about 85° C. to about 200° C. At the end of this time, the reaction mixture was withdrawn from the vessel and fractionally distilled, yielding, after recovery of an amount of unreacted methylpentadiene and the dihydropyran carboxaldehyde, dimethyl-3,4,4a,5,8,8a-hexahydro-2,1 - benzopyran-8a-carboxaldehyde in a yield of 68 per cent based on the amount of the dihydropyran carboxaldehyde that was consumed. The dimethyl-3,4,4a,-5,8,8a-hexahydro-2,1-benzopyran-8a-carboxaldehyde was found to have a boiling point of about 79° C. to 80° C. under a pressure of 1 millimeter of mercury and to have a refractive index ($n^{20}/_D$) of 1.5021 and a density ($d^{20}/_4$) of 1.04.

The structure of the compound prepared in this example may be represented by the structural formula

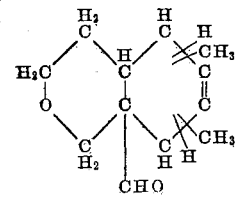

The product may be identified more specifically as comprising one or both of the following two isomers:

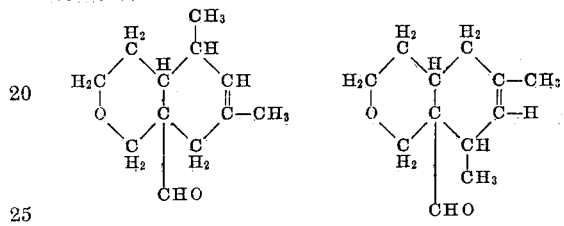

We claim as our invention:

1. As a new chemical compound, a dimethyl-3,4,4a,5,8,8a-hexahydro-2,1-benzopyran-8a - carboxaldehyde corresponding in structure to the structural formula

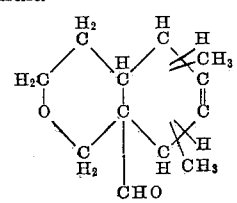

2. As a new chemical compound, 5,8-endomethylene-3,4,4a,5,8,8a - hexahydro-2,1-benzopyran-8a-carboxaldehyde.

3. As a new chemical compound, hexahydrobenzopyran carboxaldehyde corresponding in structure to the structural formula:

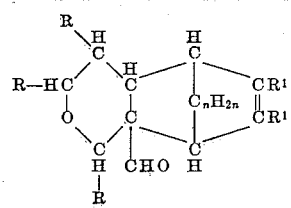

in which each R represents one of the group consisting of the hydrogen atom and the alkyl radicals, each $R^1$ represents one of the group consisting of the hydrogen atom and the saturated and the aromatic hydrocarbon radicals, and n is an integral number.

4. As a new chemical compound, a compound according to claim 3 when R represents the hydrogen atom.

5. As a new chemical compound, a hexahydrobenzopyran carboxaldehyde corresponding in structure to the structural formula

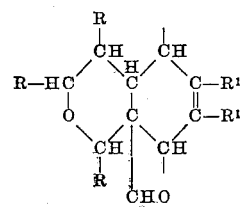

in which each R represents one of the group consisting of the hydrogen atom and the alkyl radicals, each $R^1$ represents one of the group consisting of the hydrogen atom and the saturated and the aromatic hydrocarbon radicals, and the free valencies at the carbon atoms in the 5- and 8-positions are satisfied by attachment to one of the group consisting of the hydrogen atom and the saturated and the aromatic carbon atoms.

6. As a new chemical compound, a compound according to claim 5 when R represents the hydrogen atom.

7. A process of preparing a dimethyl-3,4,4a,5,8,8a-hexahydro-2,1-benzopyran-8a-carboxaldehyde comprising heating 5,6-dihydro-1,2-pyran-3-carboxaldehyde in admixture with 2-methyl-1,3-pentadiene.

8. A process of preparing 3,4,4a,5,8,8a-hexahydro-2,1-benzopyran-8a-carboxaldehyde comprising heating 5,6-dihydro-1,2-pyran-3-carboxaldehyde in admixture with 1,3-butadiene.

9. A process of preparing a 3,4,4a,5,8,8a-hexahydro-2,1-benzopyran-8a-carboxaldehyde compound which comprises heating 5,6-dihydro-1,2-pyran-3-carboxaldehyde in admixture with an unsaturated hydrocarbon containing the diolefinic structural unit $$-CH=C(R^1)-C(R^1)=CH-$$

in which each $R^1$ represents one of the group consisting of the hydrogen atom and the saturated and the aromatic hydrocarbon radicals and in which the free valencies at the terminal carbon atoms of the unit are satisfied by attachment to one of the group consisting of the hydrogen atom, the saturated carbon atoms, and the aromatic carbon atoms.

10. A process of preparing a 3,4,4a,5,8,8a-hexahydro-2,1-benzopyran-8a-carboxaldehyde compound which comprises mixing a derivative of dihydropyran having a structure represented by the formula:

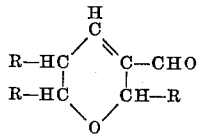

in which each R represents one of the group consisting of the hydrogen atom and the alkyl radicals, with an unsaturated hydrocarbon containing at least one conjugate pair of olefinic bonds, and heating the mixture to a temperature of from about 50° C. to about 250° C. for a time sufficient to effect reaction.

11. A process of preparing a 3,4,4a,5,8,8a-hexahydro-2,1-benzopyran-8a-carboxaldehyde compound which comprises heating an unsaturated hydrocarbon containing two olefinic bonds in conjugate relation in admixture with a dihydropyran carboxaldehyde having a structure represented by the formula

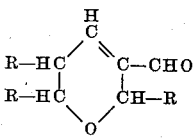

in which each R represents one of the group consisting of the hydrogen atom and the alkyl radicals.

BRADFORD P. GEYER.
SEAVER A. BALLARD.

No references cited.